March 10, 1959 E. M. HINSDALE, JR 2,877,294

COLOR TELEVISION

Filed Sept. 14, 1954 2 Sheets-Sheet 1

INVENTOR
EDWIN M. HINSDALE, JR.
BY
[signature]
ATTORNEY

COLOR TELEVISION

Filed Sept. 14, 1954 2 Sheets-Sheet 2

INVENTOR.
EDWIN M. HINSDALE, JR.
BY [signature]
ATTORNEY

United States Patent Office 2,877,294

Patented Mar. 10, 1959

2,877,294

COLOR TELEVISION

Edwin M. Hinsdale, Jr., Baldwin, N. Y., assignor to Radio Corporation of America, a corporation of Delaware Application September 14, 1954, Serial No. 455,998

6 Claims. (Cl. 178—5.4)

The present invention relates to neutralizing circuits and particularly to neutralizing circuits which are employed with synchronous demodulators in a color television receiver for eliminating or minimizing the contamination of the synchronous demodulating signal by the chrominance signal in the synchronous demodulator.

In the composite color television signal which conforms to standards approved by the Federal Communications Commission on December 17, 1953, luminance and chrominance signal information are transmitted. The luminace signal describes the brightness which is associated with the televised color scene. The chrominance signal contains color-difference signal information which describes how each color differs from the corresponding color content of that color in the luminance signal.

The color-difference signal information contained in the chrominance signal may be demodulated from the chrominance signal by synchronous detection or synchronous demodulation.

In synchronous detection, a heterodyning device is employed. In many types of heterodyning devices interelectrode capacitance cause some of the chrominance signal to appear across those electrodes to which is locally generated synchronous demodulation signal is applied; when this occurs, then the demodulating signal is given an apparent phase angle which does not correspond to the color-difference signal which is desired thereby resulting in color distortion and loss of color fidelity.

It is, therefore, an object of this invention to provide a means for improved synchronous demodulation action in a color television receiver.

It is another object of this invention to provide a means for neutralizing the spurious signal components which appear at certain input electrodes of a synchronous demodulator circuit due to the presence of stray capacitances or interelectrode capacitances.

It is a further object of this invention to provide a neutralized demodulator circuit for providing a multiplicity of color-difference signals from a chrominance signal.

It is a still further object of this invention to provide a means for preventing the chrominance signal for contaminating the demodulating signal circuits in a demodulating circuit which is adapted to produce one or more color-difference signals.

In one form of the invention, an electron control device having at least a first input terminal and a second input terminal and an output circuit is utilized. The electron control device is adapted for mixing or heterodyning each and all signals applied to the first and second input terminals. If the electron control device contains an interelectrode capacitance which essentially couples the first and second input terminals, then a chrominance signal applied to the first input terminal will contaminate a demodulating signal to the second input terminal. The contamination of the demodulating signal by the chrominance signal due to the interelectrode capacitance can be minimized or eliminated by impressing on the second input terminal, a chrominance signal of shifted phase and of suitable amplitude which will cancel the spurious chrominance signal appearing there.

In one form of the invention as applied to color television receivers, the color-difference signal demodulators are of the form whereby the chrominance signal is impressed on the anode of an amplifier tube with the demodulating signal applied to one of the control grids of the amplifier tube. The chrominance signal contamination appearing on that control grid due to the chrominance signal coupled through the interelectrode capacitances in the amplifier tube, may be eliminated by using an appropriate phase shift circuit for applying a chrominance signal of shifted phase and of suitable amplitude to the control grid. The chrominance signal appearing at the control grid due to the interelectrode capacitances is thereby minimized or cancelled. If a plurality of color-difference signal demodulators is employed in the color television receiver, each of the color-difference signal demodulators may be neutralized by employing a neutralizing chrominance signal of proper phase and amplitude.

Other and incidental objects of this invention may be understood by a study of the following specification and an inspection of the drawings wherein.

Figure 1:
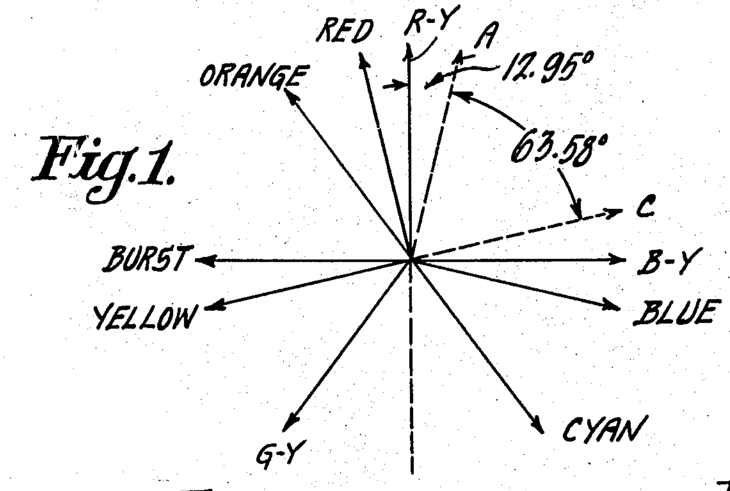
Figure 1 is a vector diagram which relates the phases of various color-difference signals contained in the chrominance signal to the phase of the color synchronizing burst.

Consider first the vector diagram shown in Figure 1. This vector diagram is roughly comparable to the color circles used by primary school children. The phase angle gives a good indication of hue while the subcarrier amplitude, when considered along with the corresponding luminance level, gives an indication of saturation.

White or neutral colors fall at the center of the diagram since these produce no subcarrier component. Any given color-difference signal corresponds to an axis or line on this vector diagram. It is seen from Figure 1 that, for example, the phase of the R–Y color-difference signal lags the burst-phase signal by 90° with the phases of the B–Y color-difference signal and the G–Y color-difference signal lagging the phase of the R–Y color-difference by 90° and 213.4°, respectively.

The color-difference signals which are contained in the chrominance signal may be recovered by synchronous detection. Color synchronizing bursts are transmitted in the composite color television signal and are utilized to phase synchronize a reference phase signal source at the receiver. The signal produced by the reference phase signal source may be passed through an appropriate phase shifter to achieve the particular phase of the color-difference signal to be demodulated and then heterodyned with the chrominance signal; this will produce the desired color-difference signal; other frequencies which remain after deterodyning may be eliminated by use of a suitable filter.

There are several types of practical synchronous detection circuits which may be used in color television receivers. Among the most common methods are those which fall into the following categories: (1) single-ended multigrid multiplier circuitry, (2) balance demodulator circuits, (3) diode or pulse modulator circuits. These and other types of circuits which may be used for demodulating color-difference signals from a chrominance signal are described in detail in the paper entitled "Color Television Signal Receiver Demodulators" by D. H. Pritchard and R. N. Rhodes as published in the June 1953 issue of the "RCA Review."

In each of the demodulating systems which were mentioned in the preceding paragraph, it is possible, due to the presence of stray capacitances or interelectrode capacitances, or inadvertent impedance coupling, that the chrominance signal might contaminate the signal from the reference phase signal source or vice versa. This will have a serious effect upon the apparent phase of the signal being provided by the reference phase signal source since its phase must be very accurately maintained in order for the correct color-difference signal information to be demodulated. Should even a small amount of chrominance signal be added to the reference-phase signal from the reference phase signal source, then the reference phase signal will experience an apparent shift in phase and a deterioration in color fidelity of a reproduced color image will result.

The neutralizing system of the present invention, then will provide a synchronous demodulator circuit means wherein the chrominance signal is not permitted to contaminate the reference phase signal from the reference phase signal source.

Figure 2:
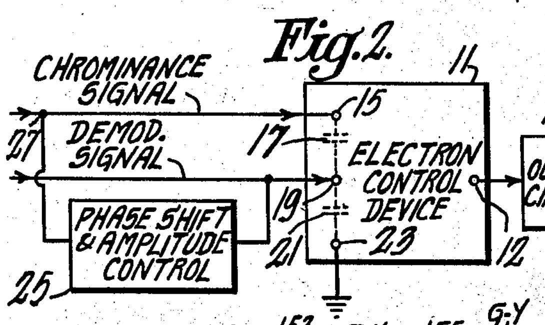
Figure 2 is a block diagram of a basic circuit for neutralizing the chrominance signal contamination of the demodulating-signal input circuit in an electron control device which performs the functions of synchronous demodulation.

Figure 2 shows an elementary circuit which provides neutralization in a synchronous demodulator according to the present invention. An electron control device 11 is utilized. This electron control device has at least a pair of input terminals 15 and 19 and an output terminal 12 which is coupled to an output circuit 13. The electron control device 11 is presumed to have non-linear impedance qualities so that signal multiplication of signals impressed on the input terminals 15 and 19 may take place. As is true of many of electron control devices which are utilized in communications circuits, interelectrode capacitances or stray capacitances or interconnection impedances are usually present which often serve to capacitively or sometimes inductively couple the input electrodes or the input and output electrodes.

If a chrominance signal is applied to the input terminal 15 and a demodulating signal is applied to the input terminal 19, synchronous demodulation can be accomplished in the electron control device 11 so that the color-difference signal corresponding to the phase of the demodulating signal applied to the input terminal 19 will appear in the output circuit 13. Due to the presence, for example, of the interelectrode capacitance 17, the chrominance signal will also be developed at the input terminal 19 and will serve to contaminate the demodulating signal impressed there. This chrominance signal appearing at the input terminal 19 will then be eliminated or neutralized by coupling a phase shift and amplitude control circuit 25 between the terminal 27 at which the chrominance signal appears, and the input terminal 19. The phase shift and amplitude control circuit 25 is coupled so that a chrominance signal is presented at the input terminal 19 and has reversed phase with respect to the chrominance signal produced there due to the action of the interelectrode capacitances 17. By choosing the correct amplitude for this neutralizing signal provided by the phase shift and amplitude control circuit 25, the chrominance signal induced at the input terminal 19 due to the interelectrode capacitance 17 may be minimized or cancelled completely thereby eliminating the contamination of the demodulating signal by the chrominance signal. It is also possible in some circuits to reverse this action whereby if the demodulating signal is caused to contaminate the chrominance signal, some demodulating signal may then be applied in proper phase and amplitude to, for example, the input terminal 15 so that any demodulating signal contaminating this terminal may be minimized or eliminated.

Figure 3:
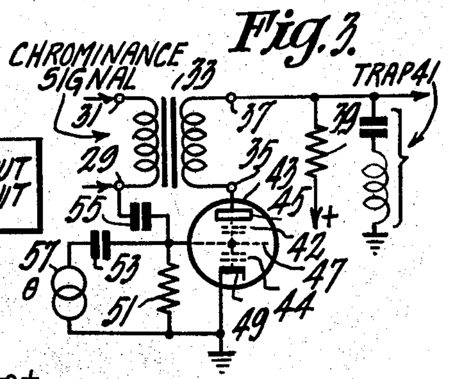
Figure 3 is a schematic diagram of a synchronous demodulator circuit which functions according to the present invention.

Consider now the operation of the circuit shown in Figure 3. This circuit is a high level synchronous demodulation or synchronous detection circuit which performs the function of synchronous demodulation yielding a demodulated color-difference signal at a high amplitude level; this circuit is particularly adaptable for neutralization utilizing the present invention.

In the circuit shown in Figure 3 the chrominance signal is applied to the terminal 29 of the transformer 33. The secondary of the transformer 33 is so connected that one terminal 35 is connected to the anode 45 of the electron tube 43 with the other terminal 37 coupled to the output load resistor 39 and to the trap 41 which is series resonant in a frequency region which is substantially in the location of the frequency of the color subcarrier. The synchronous demodulation signal source is represented by the generator 57. This generator 57 applies the synchronous demodulation signal through a grid limiting network, made up of the condenser 53 and the resistor 51, to the control grid 47 and the cathode 49 of electron tube 43. In virtue of the grid voltage limiting properties brought about by the use of the condenser 53 and the resistor 51, the electron tube 43 may be operated substantially class C so that pulses of cathode or anode current are caused to flow at a predetermined phase which is accurately determined by the phase of the synchronous detection signal provided by the generator 57. The electron tube 43 may then be considered to be a time varying impedance whose time variation has the precise frequency and phase prescribed by the generator 57. The color-difference signal whose phase corresponds to the phase of the demodulating signal provided by the generator 57 will appear across the output resistor 39; it will be appreciated that passing a chrominance signal which may be subjected to the processes of synchronous demodulation, through a time varying impedance having the prescribed phase of a color-difference signal which is to be demodulated, yields the same results as heterodyning that chrominance signal with a second signal having the precise phase and frequency of the color-difference signal in question.

The circuit shown in Figure 3 may also be caused to perform the functions of synchronous detection utilizing either other types of operation or other concepts. With regard to the utilization of new concepts, for example, the circuit can be thought of as an envelope sampling device wherein the electron tube 43 performs as a grid control rectifier. The grid control rectifier action provides conduction during that portion or phase of the chrominance signal corresponding to the particular color-difference being demolulated being sampled. Also, if the generator 57 is caused to provide a sinusoidal wave between the control grid 47 and the cathode 49 in a manner whereby the electron tube 43 operates class A, then synchronous detection action will still take place with the color-difference signal produced across the output resistor 39.

It is seen in Figure 3 that a plate-to-grid interelectrode capacitance 42 and a grid-to-cathode interelectrode capacitance 44 form part of the parameters of the electron tube 43. Because of these interelectrode capacitances, the chrominance signal which is impressed on the anode 45 from the transformer 33, is also caused to be developed between the control grid 47 and the cathode 49. Since this chrominance signal, when developed in this manner, will contaminate the signal developed at the control grid 47 by the generator 57, it is convenient to couple the condenser 55 from the transformer input terminal 29 to the control grid 47. It is seen from the connections relating to the transformer 33 that, due to the well-known principles of transformer action, the signal which is produced at the input terminal 29 will be 180° out of phase with the signal which is produced at the output terminal 35. Since the output terminal 35 of the transformer 33 is that terminal which is coupled to the anode 45, then the signal which is coupled from the input terminal 29 through the condenser 55 to the control grid 47 will be 180° out of phase with the chrominance signal developed between the control grid 47 and the cathode 49 due to the interelectrode capacitances. By proper choice of the magnitude of the condenser 55 and the other parameters associated with the control grid 47 the neutralizing signal at the control grid 47 will either cancel or minimize the chrominance signal which is developed there due to the electrode capacitances.

Figure 4:
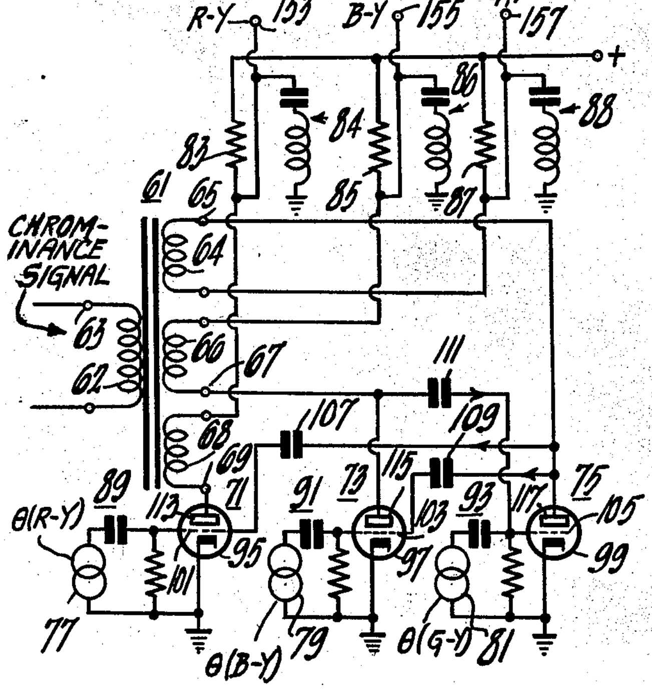
Figure 4 is a schematic diagram of a demodulator circuit for producing an R–Y, B–Y and G–Y color-difference signals from a chrominance signal, for use in a color television receiver. Each of the synchronous demodulators for producing the previously mentioned color-difference signals are neutralized using the present invention.

Figure 4 shows a demodulator circuit using the present invention; this circuit may be utilized for deriving an R–Y color-difference signal, a B–Y color-difference signal, and a G–Y color-difference signal from a chrominance signal. The demodulator circuit employs a G–Y demodulator 75, B–Y demodulator 73, and an R–Y demodulator 71; these synchronous demodulators are of the type described in detail in Figure 3. The chrominance signal is applied to the input terminal 63 and therefrom to the input winding 62 of the transformer 61. This transformer 61 has three output windings. One winding 64 impresses a chrominance signal on the anode 117 in the electron tube 99 of the G–Y demodulator 75. The second output winding 66 applies a chrominance signal on the anode 115 in the electron tube 97 of the B–Y demodulator 73, and the third output winding 68 applies the chrominance signal on the anode 113 in the electron tube 95, of the R–Y demodulator 71. A signal generator 77, providing synchronous detection phase of the R–Y signal, is used to drive the control grid 101 of the electron tube 95 using the limiting network 89 an R–Y signal is thereupon produced across the output resistor 83. The generator 79, which produces a synchronous demodulating signal having the B–Y phase, is coupled by way of the limiting network 91 to the control grid 103 of the electron tube 97 and a B–Y signal is thereupon developed across the output resistor 85. In like manner the generator 81 producing a synchronous demodulating signal having the (G–Y) phase is coupled by way of the limiting network 93, to the control grid 105 of the electron tube 99. By coupling the secondary winding 64 in a manner whereby the chrominance signal is presented in reversed phase with respect to the chrominance signal phase applied to the R–Y and B–Y demodulators 71 and 73, the G–Y signal is produced across the output resistor 87.

The neutralizing of the demodulating circuit shown in Figure 4 is accomplished in the following fashion. Note that the output windings of the transformer 61 are so connected that the output terminal 65 of the output winding 64 produces a chrominance signal 180° out of phase with respect to the phase of the chrominance signals produced at the output terminal 67 of the output winding 66 or at the output terminal 69 of the output winding 68. By coupling the chrominance signal appearing at this output terminal 65 through the condenser 107 to the control grid 101 of the electron tube 95, and through the condenser 109 to the control grid 103 of the electron tube 97, the synchronous demodulators 71 and 73 which yield the R–Y and B–Y color-difference signals may be neutralized.

The chrominance signal provided at the output terminal 67 of the output winding 66 is 180° out of phase with respect to the phase of the chrominance signal appearing at the output terminal 65 of the output winding 64. Then by coupling the chrominance signal appearing at the output terminal 67 through the condenser 111 to the control grid 105 of the electron tube 99 of the G–Y demodulator 75, neutralizing of the G–Y demodulator is accomplished.

Figures 5, 6:
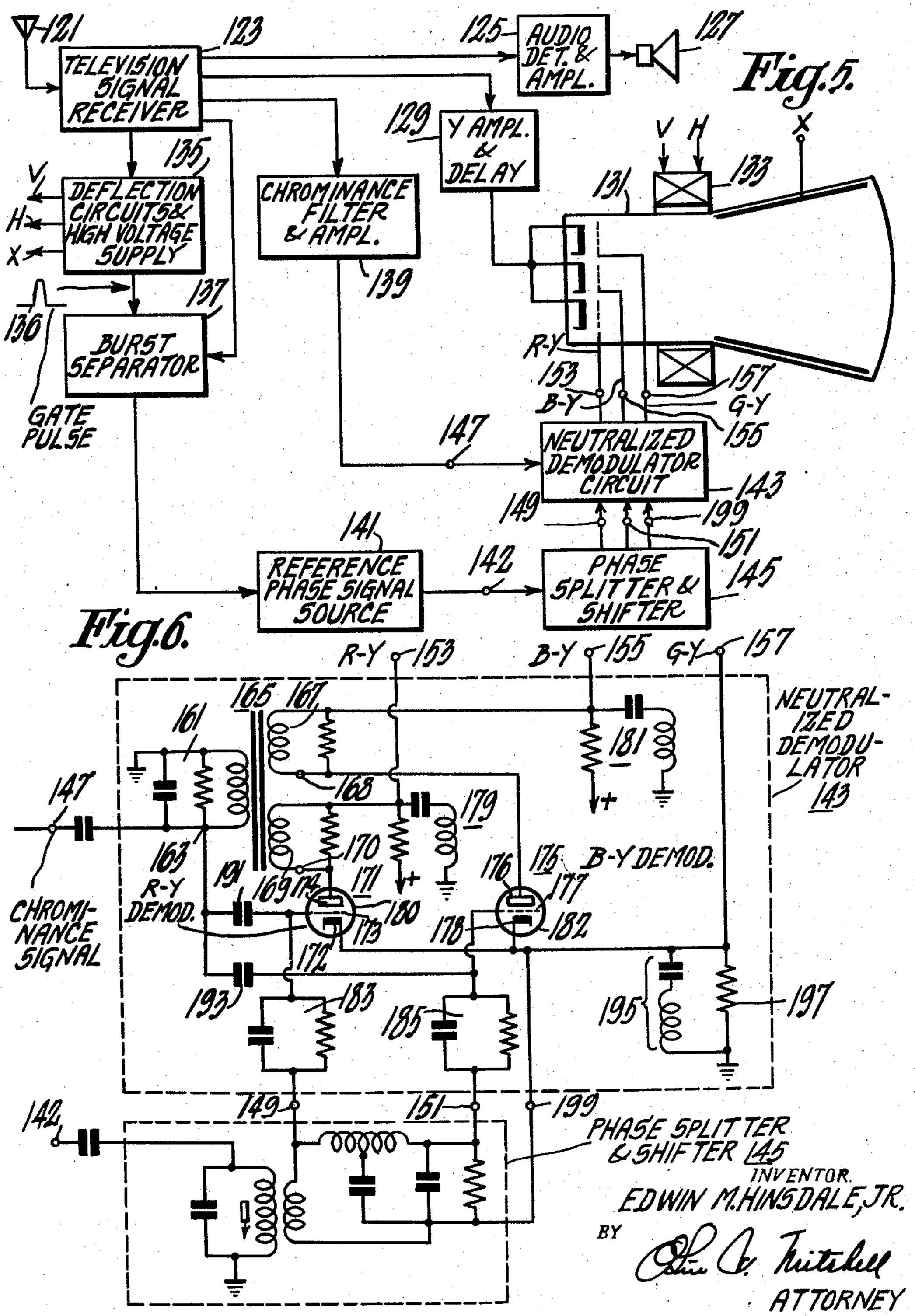
Figure 5 is a block diagram of a color television receiver which employs a neutralized demodulator circuit.
Figure 6 is a schematic diagram of one form of a neutralized demodulator of the present invention.

Consider now the operation of the color television receiver whose block diagram is shown in Figure 5; this color teleivsion receiver includes a neutralized demodulator circuit 143 which functions in accordance with the teachings of the present invention.

The incoming color television signal which is transmitted on a video carrier reaches the antenna 121 and is applied to the television signal receiver 123. In the television signal receiver 123 the composite color television signal is demodulated. This composite color television signal includes the sound-modulated carrier which is transmitted 4½ mc. removed from the video carrier.

The television signal receiver 123 performs such various well-known functions as first detection, intermediate frequency amplification, second detection, and such secondry functions as automatic gain control and co-channel and adjacent channel interference elimination. These and other functions are described in detail in, for example, the article by Antony Wright entitled "Television Receivers" as published in the March 1947 issue of the "RCA Review."

There are many methods of extracting the sound information from the composite color television signal. One of the best known uses an intercarrier sound circuit; using this circuit, for example, the sound information may be recovered in the audio detector and amplifier 125 and applied to the loud speaker 127.

The composite color television signal is also applied to the deflection circuits and high voltage supply 135. The deflection circuits and high voltage supply 135 produce horizontal and vertical deflection signals from the various synchronizing signals contained in the composite color television signal and apply these vertical and horizontal deflection signals to the yokes 133. In addition, a gate pulse 136 is provided which is applied to the burst separator 137 to which is also applied the composite color television signal. In the burst separator 137 the color synchronizing burst is separated from the composite color television signal and applied to the reference phase signal source 141 which, by way of the phase splitter and shifter 145, applies a pair of appropriately phased synchronous demodulating signals to the input terminals 149 and 151, respectively, of the neutralized demodulator circuit 143.

The composite color television signal is also applied to the chrominance filter and amplifier 139 which separates the chrominance signal from the composite color television signal. If the full utilization of the color-difference signal information is to be accomplished, then the chrominance filter in the chrominance filter and amplifier 139 will have a pass band from substantially 2 to 4.2 mc. If color-difference signal frequencies up to approximately 0.6 megacycle are to be utilized, then the chrominance filter need filter only those components which exist in the region between substantially 3 to 4.2 mc. The chrominance signal is then applied to the input terminal 147 of the neutralized demodulator circuit 143. The neutralized demodulator circuit 143, responsive to the demodulating signals as applied to the input terminals 149 and 151, respectively, yields the R–Y, B–Y and G–Y color-difference signals at the output terminals 153, 155, and 157, respectively; these color-difference signals are applied to appropriate control electrodes of the color image reproducer 131.

The composite color television signal is applied through the Y amplifier and delay 129 to the cathodes of the color image reproducer 131. Since the composite color television signal represents to a large degree the luminance signal information, the impressing of this signal, properly delayed, on the cathodes of the color image reproducer 131 causes the luminance signal or Y signal to be added in correct phase and amplitude to the G–Y, B–Y and R–Y signals which are applied to the control electrodes so that appropriate addition of these signals is accomplished within the color image reproducer. In some types of color-television receivers it is appropriate to add the Y or luminance signal to the color-difference signals in external circuits which then apply the recovered component color signals to appropriate electrodes of the color image reproducer.

Figure 6 is a schematic diagram of one form of the neutralized demodulator 143, which is neutralized in accordance with the present invention. The chrominance signal is applied to the input terminal 147 and therefrom to the input circuit 161 which has a pass band corresponding to the particular color-difference signals which are to be utilized in the reconstruction of the transmitted color image. The input circuit 161 includes the secondary winding input circuit of the transformer 165 which has two output circuits consisting of the output winding 167 and the output winding 169. The neutralized demodulator 143 utilizes only a pair of synchronous demodulator circuits as compared to, for example, the trio of synchronous demodulator circuits which are employed in Figure 4. The first of the synchronous demodulator circuits is the R–Y demodulator bearing the designator 171 and employing the demodulator tube 180; a chrominance signal is applied to the anode 174 from the terminal 170 of the output winding 169. A synchronous demodulator signal is applied by the phase splitter and shifter 145 to the input terminal 149 which couples this synchronous demodulating signal through the biasing circuit 183 to the control grid 173 of the R–Y demodulator 171. An output circuit 179 is provided with the R–Y demodulator 171; this output circuit includes a series resonant trap to ground so that the signals having frequencies in the vicinity of the chrominance signal may be shunted to ground.

A B–Y demodulator bearing the designator 175 and employing the demodulator tube 182 is also employed. This demodulator receives a chrominance signal from the terminal 168 of the output winding 167. The B–Y demodulator 175 includes the output circuit 181; it receives its synchronous detection signal from the phase splitter and shifter 145 which is coupled to the input terminal 151. This synchronous demodulating signal is then applied through the biasing circuit 185 to the control grid 177. The output circuit 181 of the B–Y demodulator 175 also includes a series resonant trap which will shunt signals having frequencies in the vicinity of the chrominance signal to ground.

The cathodes 172 and 178 of the demodulator tubes 180 and 182, respectively, are coupled together and connected through the cathode resistor 197 to ground. This cathode resistor 197 is also shunted by the series resonant trap 195 which exhibits series resonance at substantially the frequency of the chrominance signal. By impressing a synchronous demodulating signal having the phase "A" shown in Figure 1 which lags the R–Y color-difference signal phase by 12.95° on the input terminal 149 of the R–Y demodulator 171, and by impressing a synchronous demodulating signal having the phase "C" shown in Figure 1 with this phase lagging the "A" phase by 63.58°, on the input terminal 151 of the B–Y demodulator 175, color-difference signal addition will take place in the cathode resistor 197; the color-difference signal corresponding to phase "A" will also drive the B–Y demodulator 175 and the color-difference signal corresponding to phase "C" produced in the B–Y demodulator 175 will also drive the R–Y demodulator 171. If the chrominance signal impressed on the anode 174 of the R–Y demodulator 171 is in the amplitude ratio of 1.39:1 with respect to the chrominance signal which is applied to the anode 176 of the B–Y demodulator 175, then an R–Y color-difference signal will appear at the out-put terminal 153 and a B–Y color-difference signal will appear at the output terminal 155; the combination of these two color-difference signals in reversed phase as produced across the cathode resistor 197 will yield a G–Y color-difference signal at the output terminal 157. A detailed description of the demodulator portion of the neutralized demodulator 143 as thus far described is contained in the copending application entitled "Color Television" by Stuart W. Seeley and Albert Macovski bearing the Serial No. 456,017 and filed September 14, 1954, now Patent No. 2,832,819, issued on April 29, 1958.

Because of the interelectrode capacitances in the demodulator tubes 180 and 182, the chrominance signal impressed on the anodes 174 and 176 will also appear at the control grids 173 and 177 in a manner which will be injurious to the color rendition of the recovered color television image if neutralization is not employed.

Note that the terminal 163 of the input circuit 161 of the transformer 165 yields a chrominance signal which is 180° out of phase with respect to the chrominance signal appearing at the terminal 168 of the secondary winding 167 or at the terminal 170 of the secondary winding 169. Neutralization of the neutralized demodulator 143 may then be achieved by coupling the condenser 191 from the terminal 163 to the control grid 173 of the R–Y demodulator 171 and the condenser 193 from the terminal 163 to the control grid 177 of the B–Y demodulator 175. By choosing appropriate values for these condensers, 191 and 193, the correct amount of chrominance signal in reversed phase will be applied to these control grids 173 and 177 to neutralize any chrominance signal induced at the control grids due to the presence of interelectrode capacitances in the demodulator tubes 180 and 182.

Having described the invention, what is claimed is:

1. In combination: a first circuit to provide a chrominance signal; a first means coupled to said first circuit to develop therefrom a chrominance signal of opposite polarity relative to the polarity of the chrominance signal provided by said first circcuit; a second circuit to provide a demodulating signal having a prescribed frequency and phase of said chrominance signal; a synchronous demodulator having a chrominance signal input terminal and a demodulating signal input terminal and comprising apparatus to both demodulate a chrominance signal applied to said chrominance signal input terminal at the phase of a demodulating signal applied to said demodulating signal input terminal and to couple said chrominance signal from said chrominance signal input terminal to said demodulating signal input terminal, means coupled between said first and second circuits and said synchronous demodulator to apply said chrominance signal and said demodulating signal to said chrominance signal input terminal and to said demodulating signal input terminal respectively to develop said chrominance signal at said demodulating signal input terminal and to produce a demodulated signal; means coupling said first means to said demodulating signal input terminal to apply said chrominance signal of opposite polarity to said demodulating signal input terminal to cancel the chrominance signal developed there by way of the coupling through said synchronous demodulator from said chrominance signal input terminal.

2. In combination: a first circuit to provide a chrominance signal; a first means coupled to said first circuit to develop therefrom a chrominance signal of opposite polarity relative to the polarity of the chrominance signal provided by said first circuit; a second circuit to provide a demodulating signal having a prescribed frequency and phase of said chrominance signal; a demodulator circuit including an electron tube having a cathode and a first control grid and an electrode positioned in the path of electron discharge from said cathode at a point after said electron discharge passes through said control grid, said electron tube including an interelectrode capacitance between said electrode and said control grid and operative to develop a demodulated color difference signal as a result of a chrominance signal applied between said electrode and said cathode and a demodulating signal applied between said control grid and said cathode, said chrominance signal applied to said electrode thereupon being coupled to said control grid by way of said interelectrode capacitance; means coupled between said first circuit and said demodulator circuit to apply said chrominance signal between said electrode and said cathode, means coupled between said second circuit and said demodulator circuit to apply said demodulating signal between said control grid and said cathode, and means coupling said first means to said control grid to apply said opposite-phase chrominance signal thereto to cancel any chrominance signal information coupled from said electrode to said control grid by way of said interelectrode capacitance.

3. In combination: a first circuit to provide a chrominance signal, a first means included in said first circuit to develop a chrominance signal of opposite polarity relative to the polarity of the chrominance signal provided by said first circuit, a second circuit to provide a demodulating signal having a prescribed frequency and phase of said chrominance signal, an electron tube having an anode, a cathode and a control grid, circuit means coupled to said electron tube to provide demodulation of a chrominance signal as a result of a chrominance signal applied between said anode and said cathode and a demodulating signal applied between said control grid and said cathode, said electron tube having an interelectrode capacitance between said anode and said control grid whereby chrominance signal information applied to said anode is coupled to said control grid, means coupled between said first circuit and said electron tube to apply said anode chrominance signal between said anode and said cathode, means coupled between said second circuit and said electron tube to apply said demodulating signal between said control grid and said cathode whereby said electron tube develops demodulated signal occurring at the phase of the demodulating signal in said chrominance signal, and circuit means coupled between said first means and said control grid to apply said chrominance signal of opposite polarity to said control grid to cancel the chrominance signal information coupled from said anode to said control grid by way of said interelectrode capacitance.

4. In combination: a pair of synchronous detectors each having a chrominance signal input circuit, a demodulating signal input circuit and an output circuit and each having an impedance coupling between the chrominance signal input circuit and the demodulating signal input circuit of that synchronous detector whereby any chrominance signal applied to said chrominance signal input circuit will be developed at said demodulating signal input circuit, a common output circuit commonly coupled to said pair of synchronous detectors to develop signal addition of demodulated signals developed by both of said pair of synchronous detectors; a source of a chrominance signal coupled to each of the chrominance signal input circuits of said pair of synchronous detectors, a source of first and second demodulating signals having first and second phases respectively coupled to the demodulating signal input circuits of respective ones of said pair of synchronous detectors whereby demodulated signals representative of color information occurring at different phases of said chrominance signal are developed in the output circuits of each of said pair of synchronous detectors and across said common output circuit, and means coupled from said source of chrominance signal to said demodulating signal input circuits to apply the opposite polarity of said chrominance signal to the demodulating signal input circuits of both of said pair of synchronous detectors to cancel any chrominance signal information coupled thereto by way of the impedance coupling in both of said pair of synchronous detectors.

5. In a color television receiver adapted to receive a color television signal which includes a color subcarrier including different color information signals occurring at different phases of that color subcarrier, each of said phases referred to a reference phase, the combination of: a plurality of synchronous demodulator circuits, each of said synchronous demodulator circuits having a color subcarrier input circuit and a demodulating signal input circuit and an output circuit and including impedance coupling between said color subcarrier input circuit and said demodulating signal input circuit and operative to demodulate a color information signal into said output circuit as a result of a color subcarrier and a demodulating signal applied to said color subcarrier input circuit and to said demodulating signal input circuit, respectively, and to couple said color subcarrier to said demodulating signal input circuit, a source of a color subcarrier coupled to the color subcarrier input circuit of each of said plurality of synchronous demodulator circuits, a source of demodulating waves of different phases coupled to the demodulating signal input circuits of each of said plurality of synchronous demodulator circuits, a plurality of phase shift circuits each comprising apparatus to provide a phase shift 180 degrees to a wave applied thereto, means coupling a different one of said plurality of phase shift circuits between the color subcarrier input circuit and the demodulating signal input circuit of each of said plurality of synchronous demodulator circuits to cancel the color subcarrier information coupled through each synchronous demodulator circuit from the color subcarrier input circuits to the demodulating signal input circuit of that synchronous demodulator circuit by way of the impedance coupling included therein.

6. In a color television receiver adapted to receive a color television signal including a chrominance signal wherein occur a plurality of color difference signals and also color synchronizing bursts, said bursts having a phase related to a reference phase of said chrominance signal, the combination of: a pair of electron control devices each having an anode, a cathode and a control electrode and a first output circuit coupled to said anode and an interelectrode capacitance between the anode and control electrode; a common output circuit commonly coupled to the cathodes of both said electron control devices; means to apply a first polarity of said chrominance signal between the anode and the cathode of each of said electron control devices whereby said chrominance signal is coupled to said control electrodes by way of said interelectrode capacitances; means to derive from said color synchronizing bursts a first and second demodulating signal having first and second phases respectively of said chrominance signal, means coupling said first demodulating signal between the control electrode and cathode of said first electron control device whereby a first polarity of a first color difference signal corresponding to said first phase of said chrominance signal is developed across the output circuit of said first electron control device and also an opposite polarity of said first color difference signal is developed across the common output circuit, means coupling said second demodulating signal between the control electrode and cathode of said second electron control device to develop a first polarity of a second color difference signal across the output circuit of said second electron control device and also a second polarity of said second color difference signal across said common output circuit; and means to apply a second and opposite polarity of said chrominance signal to the control electrodes of each of said pair of electron control devices to cancel the chrominance signal of first polarity coupled thereto by the interelectrode capacitances included in each of said electron control devices.

References Cited in the file of this patent

UNITED STATES PATENTS

| | | |
|---|---|---|
| 2,429,636 | McCoy | Oct. 28, 1947 |
| 2,644,030 | Moore | June 30, 1953 |
| 2,743,310 | Schroeder | Apr. 24, 1956 |
| 2,754,356 | Espenlaub | July 10, 1956 |

OTHER REFERENCES

Color TV, Rider Pub., March 1954, pages 141, 142.

Introduction to Color TV, Admiral Corp., February 1954, pages 17 to 27.

Two-Color Receiver, RCA, November 1949, pages 9, 10.